United States Patent
Lambertz et al.

[11] Patent Number: 6,012,846
[45] Date of Patent: Jan. 11, 2000

[54] GUIDE RAIL FOR A LINEAR BEARING

[75] Inventors: Hans-Reinhard Lambertz, Erkrath; Klaus Nottebaum, Hilden; Ulrich Leber, Dusseldorf; Annette Welsch, Homburg, all of Germany

[73] Assignee: Ina Walzlager Schaeffler oHG, Germany

[21] Appl. No.: 09/171,346

[22] PCT Filed: Mar. 19, 1997

[86] PCT No.: PCT/EP97/01371

§ 371 Date: Nov. 9, 1998

§ 102(e) Date: Nov. 9, 1998

[87] PCT Pub. No.: WO97/39252

PCT Pub. Date: Oct. 23, 1997

[30] Foreign Application Priority Data

Apr. 17, 1996 [DE] Germany .......................... 196 15 075

[51] Int. Cl.[7] .................................................. F16C 29/06
[52] U.S. Cl. .................................................. 384/15; 384/45
[58] Field of Search .................................. 384/15, 44, 45

[56] References Cited

U.S. PATENT DOCUMENTS

| | | |
|---|---|---|
| 1,941,175 | 12/1931 | Johnson . |
| 3,845,993 | 11/1974 | Schiler . |
| 5,308,167 | 5/1994 | Tsukada .................................... 384/45 |
| 5,622,433 | 4/1997 | Suzuki et al. ............................. 384/45 |

FOREIGN PATENT DOCUMENTS

| | | |
|---|---|---|
| 0311895 | 4/1989 | European Pat. Off. . |
| 0539600 | 5/1993 | European Pat. Off. . |
| 1085586 | 7/1960 | Germany . |
| 1575711 | 2/1970 | Germany . |
| 3046590 | 7/1982 | Germany . |
| 8324497 | 12/1983 | Germany . |
| 3313128 | 10/1984 | Germany . |
| 237805 | 7/1986 | Germany . |
| 3812505 | 10/1988 | Germany . |
| 9316349 | 3/1994 | Germany . |
| 9320135 | 3/1994 | Germany . |
| 4311641 | 4/1994 | Germany . |
| 9408850 | 10/1994 | Germany . |
| 9420428 | 3/1995 | Germany . |
| 198920 | 7/1989 | Japan . |

*Primary Examiner*—Thomas R. Hannon
*Attorney, Agent, or Firm*—Bierman, Muserlian and Lucas

[57] ABSTRACT

A guide rail (5) for a linear bearing has a plurality of through-apertures (4) starting from the upper surface (3) of the guide rail and spaced apart behind one another in the longitudinal direction of the guide rail for receiving fixing elements, the guide rail also having a longitudinal groove (2) which is open towards the upper surface (3) of the guide rail (5) and extends over the entire length of the guide rail, a cover strip (1) being inserted and fixed in the longitudinal groove (2) to seal the through-apertures (4) on the outside. The cover strip (1) has a larger width than the longitudinal groove (2) of the guide rail (5) and is pressed into the longitudinal groove (2) with formation of a bulge towards the guide rail (5).

10 Claims, 1 Drawing Sheet

GUIDE RAIL FOR A LINEAR BEARING

FIELD OF THE INVENTION

The invention concerns a guide rail for a linear bearing comprising a plurality of through-apertures starting from an upper surface of the guide rail and spaced apart behind one another in a longitudinal direction of the guide rail for receiving fixing elements, said guide rail further comprising a longitudinal groove which is open towards the upper surface of the rail and extends over an entire length of the rail, a cover strip being inserted and fixed in the longitudinal groove to seal the through-apertures outwardly.

BACKGROUND OF THE INVENTION

Guide rails are used on machine tools and, being wear parts, they have to be replaced from time to time. They are therefore frequently fixed on the machine frame with screws. To seal the radially widened end portions of the bores which receive the screw heads, it is known, for example from DE-OS 30 46 590 and DE-GM 93 16 349 to insert a plug or a cap into each end portion. The use of caps has the drawback of too low mechanical retention forces. In addition, this also requires a cost-intensive assembly because each cap has to be individually inserted.

It is also possible to provide a groove-like recess on the guide rail in alignment with the fixing bores and fit a cover strip into the recess. Such an arrangement is shown for example in DD-PS 237 805, in which the cover strip can be glued to the guide rail within the groove-shaped recess. However, there exists the danger of the glued joint getting disengaged.

In a linear motion guide known from DE-PS 43 11 641, a cover strip made of resilient strip material is slipped on to the guide rail whereby inwardly bent edge regions of the strip engage into undercuts of the guide rail. The undercuts are situated on the two parallel longitudinal surfaces of the guide rail, while the entire upper surface of the guide rail is covered by the cover strip. The drawback of this configuration is that the fixing of the cover strip on the guide rail is very unstable and the width of the strip must correspond to the entire width of the guide rail. Another drawback is that the cover strip can only be stocked in a spread-out state or in the form of a roll of very large diameter because, otherwise, an unfolding of the bent edges would impair the retaining function. Since the strip can only be rolled in a very large diameter, transportation is problematic. Furthermore, only thin strips can be used because they have to be guided over the side surfaces of the guide rail where only a small space is available. Thus only low retention forces are obtained. The strip can be pressed in over the through-apertures and can be easily disengaged even at the center of the rail. If the guide carriage is already installed on the guide rail, the mounting of the cover strip on the guide rail is only possible with great difficulty and with a reduction of the clamping forces.

A guide rail of the initially cited type is also known from EP-OS 0 311 895. In this case, the longitudinal groove on the upper surface of the rail needs to be only so wide that the inserted cover strip reliably seals the through-apertures of the guide rail which are spaced one behind the other in the longitudinal direction of the rail. The cover strip is glued on the guide rail to the bottom of the longitudinal groove between every two successive through-apertures. This results in a stable arrangement of the cover strip but it is not easy to disengage it again from the guide rail. When disengagement has been effected by applying a high force, both the cover strip and the guide rail have to be freed of the glue, for example by grinding.

SUMMARY OF THE INVENTION

The object of the invention is to create a cover for the through-apertures of a guide rail which, while being strongly fixed, is easy to mount and dismount.

The invention achieves this object by the fact that the cover strip has a larger width than the longitudinal groove of the guide rail and is pressed into the longitudinal groove with formation of a bulge towards the rail. Due to its resilience, the cover strip claws itself into the side surfaces of the longitudinal groove so that the strip is retained in the groove. Due to the fact that, prior to mounting, the strip is flat, it can be wound into a compact roll so that it is possible to manufacture it economically and to transport it in very large lengths. The cover strip requires no intensive working and bending operations are not necessary so that a cost advantage is obtained. The width of the strip can be made to close tolerances. With the help of suitable auxiliary equipment, the mounting of the strip can be automated. The strip can be pressed, for example, into the longitudinal groove of the guide rail with the help of a roller which is connected to a magazine of wound-up strip and rolls over the top surface of the guide rail. A dismounting of the cover strip is possible without damage thereto. Dismounting is started at the ends of the rail so that an unintentional disengagement of the strip in the functional region of the guide rail cannot occur. The cover strip can also be mounted on a guide rail on which the guide carriage is already in place by having the carriage push the flat strip between the carriage back and the upper surface of the guide rail. For pressing the strip into the groove, the carriage is then partially displaced.

The longitudinal groove of the guide rail may have a rectangular cross-section but it is also possible to configure this groove with a shoulder so that the depth of pressing-in of the strip is maintained within narrow limits. Finally, the longitudinal groove may also have a dovetail configuration. The undercut thus obtained increases the retention force for the strip. Thus, the longitudinal groove of the guide rail may be configured with different cross-sections. Further, a groove with a concave cross-section which, at the same time, limits the pressing-in depth of the strip can be optimal for roller working.

The cover strip can be made, for example, of a resilient steel sheet and be provided with an anti-corrosive coating. On its undersurface facing the guide rail, and/or on its edges, the cover strip can be coated with rubber to prevent capillary infiltration. This rubber coating can also serve as an additional spring to reinforce the resilience of the strip material. This results in a sealing between the side walls of the longitudinal groove and the cover strip which enables the guide rail equipped with the cover strip to be used in aggressive media as well.

The fixing elements of the guide rail can be screws, for example, and the through-apertures of the guide rail can be configured as stepped bores so that a good accommodation of the screw shanks and the screw heads in the guide rail is assured. The guide rail of the invention has a high potential of automation and very good transportation properties.

BRIEF DESCRIPTION OF THE DRAWINGS

Some embodiments of the invention are represented in the drawings and will be described more closely below.

DETAILED DESCRIPTION OF THE DRAWINGS

Figure 1:
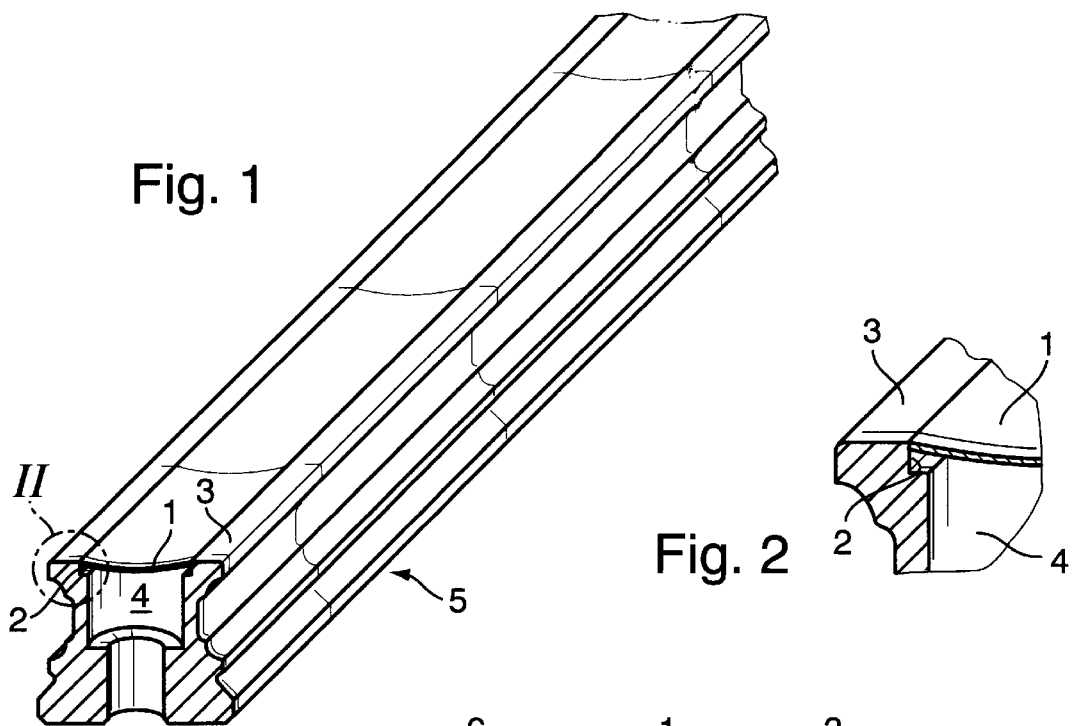
FIG. 1 is a perspective view of a guide rail whose longitudinal groove has a rectangular cross-section, one end of the guide rail being shown in a sectional view in the region of a through-aperture.

A cover strip 1 made of a resilient strip material, for example a steel sheet, is inserted into a longitudinal groove 2 of a guide rail 5. The resilient force mechanism of the strip material can be created by the elastic properties of the material itself or by external resilience, e.g. by the application of a rubber coating. The longitudinal groove 2 starts from the upper surface 3 of the rail and has a somewhat smaller width than the cover strip 1. Therefore, on insertion into the longitudinal groove 2, the cover strip 1 is bulged towards the guide rail 5. The cover strip 1 situated in the longitudinal groove 3 seals a plurality of vertical through-apertures 4 arranged in spaced relationship behind one another in the longitudinal direction of the guide rail 5. In the illustrated embodiments, these apertures are configured as stepped bores for receiving fixing screws.

Figure 2:
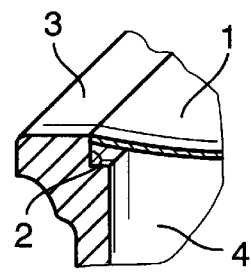
FIG. 2 is an enlarged detail of the encircled portion 11 of the end shown in FIG. 1.
Figure 3:
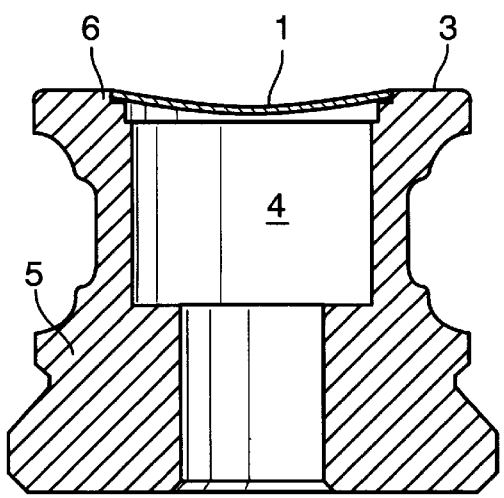
FIG. 3 is a cross-section through a guide rail comprising a longitudinal groove having a shoulder.
Figure 4:
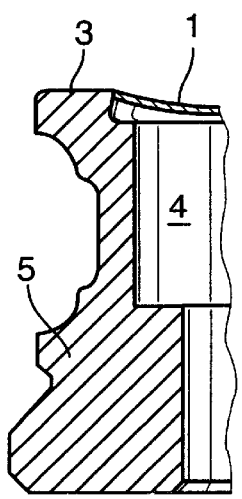
FIG. 4 is a cross-section through a guide rail comprising a dovetailed longitudinal groove.
Figure 5:
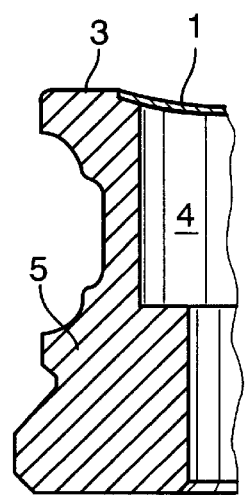
FIG. 5 is a cross-section through a guide rail comprising a longitudinal groove with a concave bottom surface.

Due to its bulging, the cover strip 1 develops a force of resilience which acts on the side surfaces of the longitudinal groove 2. In this way, the cover strip 1 is retained in the longitudinal groove 2 of the guide rail 5. The longitudinal groove 2 shown in FIGS. 1 and 2 has a rectangular configuration. The longitudinal groove of FIG. 3 comprises a shoulder 6 so that the pressing-in depth of the cover strip 1 is kept within narrow limits. FIG. 4 shows a longitudinal groove with a dovetail cross-section so that the retention force is increased by the thus obtained undercut. In FIG. 5, the longitudinal groove has a concave groove bottom so that a contact surface for the cover strip 1 is obtained which corresponds to the bulge of the cover strip 1.

We claim:

1. A guide rail for a linear bearing comprising a plurality of through-apertures starting from an upper surface of the guide rail and spaced apart behind one another in a longitudinal direction of the guide rail for receiving fixing elements, said guide rail further comprising a longitudinal groove which is open towards the upper surface of the guide rail and extends over an entire length of the guide rail, a cover strip being inserted and fixed in the longitudinal groove to seal the through-apertures outwardly, characterized in that the cover strip (1) has a larger width than the longitudinal groove (2) of the guide rail (5) and is pressed into the longitudinal groove (2) with formation of a bulge towards the guide rail (5).

2. A guide rail according to claim 1, characterized in that, as seen in cross-section, the longitudinal groove (2) has a rectangular configuration.

3. A guide rail according to claim 1, characterized in that the cover strip (1) is a resilient strip material.

4. A guide rail of claim 3, characterized in that the cover strip (1) comprises an anti-corrosive coating.

5. A guide rail of claim 3, characterized in that, on an undersurface facing the guide rail (5) and/or on end regions, the cover strip (1) comprises a rubber coating.

6. A guide rail of claim 1, characterized in that the through-apertures (4) of the guide rail (5) are configured as stepped bores.

7. A guide rail of claim 1, characterized in that the fixing elements of the guide rail (5) are screws.

8. A guide rail of claim 1, characterized in that, as seen in the cross-section, the longitudinal groove comprises a shoulder (6).

9. A guide rail of claim 1, characterized in that, as seen in cross-section, the longitudinal groove has a dovetail configuration.

10. A guide rail of claim 1, characterized in that, as seen in cross-section, the longitudinal groove has a concave groove bottom.

* * * * *